June 13, 1961     E. WESTERBERG     2,988,403
PNEUMATIC TRANSPORTING APPARATUS
Filed Dec. 8, 1959
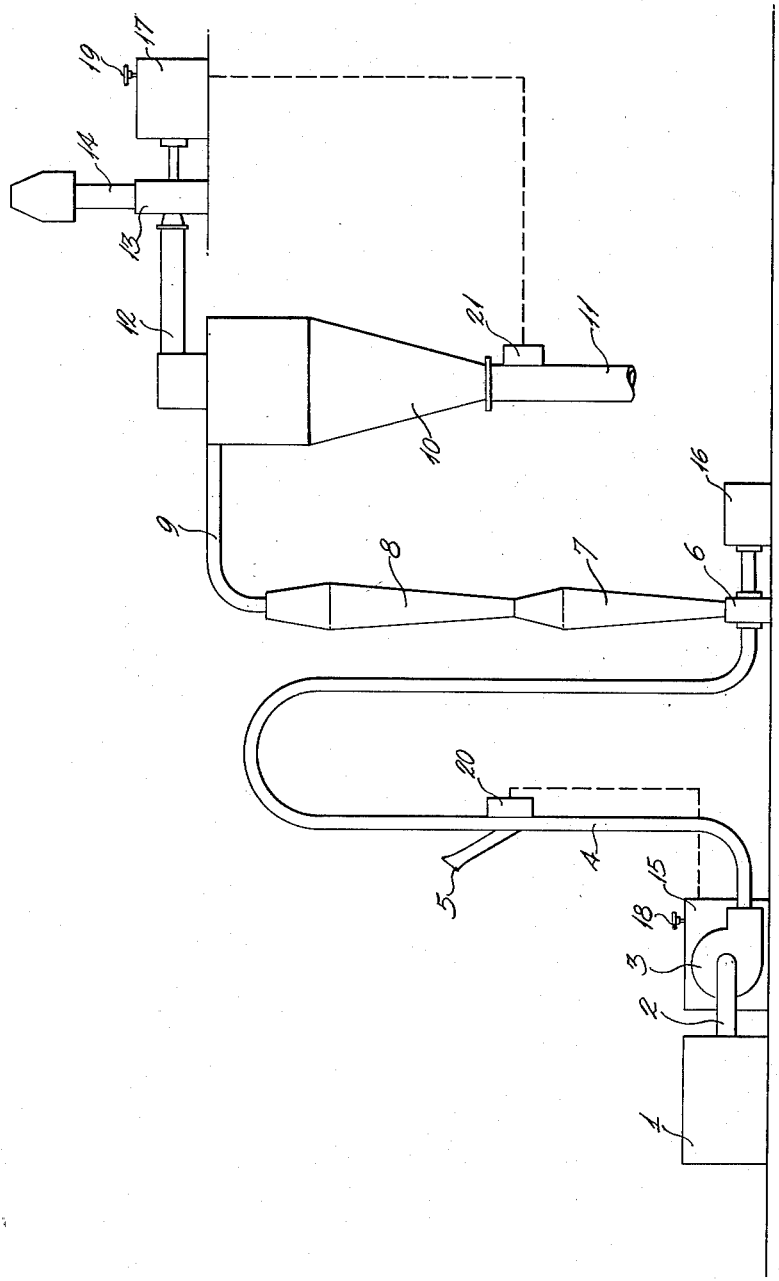
INVENTOR:
ELOF WESTERBERG
BY Howson & Howson
ATTYS.

United States Patent Office 2,988,403
Patented June 13, 1961

2,988,403
PNEUMATIC TRANSPORTING APPARATUS
Elof Westerberg, Stockholm, Sweden, assignor to Aktiebolaget Svenska Flaktfabriken, Nacka, Sweden
Filed Dec. 8, 1959, Ser. No. 858,149
Claims priority, application Sweden Dec. 11, 1958
1 Claim. (Cl. 302—17)

In all pneumatic transport apparatus and especially such used for drying or other treatment of granular or pulverulent materials the proper feeding into and discharge from the transport system respectively of the materials always constitutes a problem, since leakage at these points must be avoided to the utmost possible extent. Usually, therefore, injectors and sluicing devices are used for the feeding of the material into the system and the cyclone used for the separation of the material is also provided with a sluicing device at the material outlet. However, there often exists a need to pneumatically dry, cool or condition a material whose character is such that it cannot be passed through such feeding and discharge devices—or at any rate cannot pass through the same without risk of damage to the material. Certain materials for instance, before the treatment, are so wet or sticky that they cannot be fed by the mentioned devices and others, for instance fibrous materials, are both in wet and dry condition hard to get through such a device. Finally, there are materials, such as grain, seed, etc., which, it is true, without difficulty can pass through a sluicing device but which thereby easily are crushed or in other ways are damaged. For all these materials prior to the present invention pneumatic treatment has been practically out of the question or was possessed of severe drawbacks.

The present invention, which intends to eliminate the mentioned feeding and discharge difficulties, is characterized in that the apparatus is provided with three fans, one of which is placed upstream of the inlet or feeding point for the material, a second one of which is placed downstream of the cyclone used for the separation and discharge of the material, and a third one of which is placed between said inlet and discharge points for the material. Furthermore, at least one of these fans is equipped with a speed control means which is operable to maintain zero pressure at the feeding point for the material as well as at its point of discharge from the separation cyclone.

The invention will now be more fully described with reference to the accompanying drawing, which in principle shows a pneumatic transport apparatus intended for drying of a material of the above mentioned kind.

In the drawing 1 indicates a heating element or heat exchanger for heating of a gaseous transport medium, combustion gas or air for pneumatic transport of a material which is to be treated in the drier. The drier consists of a tube coil 4 and two double conical conveying tube sections 7 and 8 coupled in series. The material, which is fed into the drier at an inlet or feeding point through a chute 5, is after the treatment separated from the transport and treatment medium in a cyclone 10 and is discharged through its open outlet 11. In accordance with the invention the apparatus is equipped with three fans 3, 13 and 6. The fan 3 is placed upstream of the feeding point of the material. The fan 13 is downstream of the cyclone used for the separation of the material. The fan 6 is placed substantially halfway between the feeding and discharge points for the material. The fan 3 on the suction side is connected with the heating element or heat exchanger 1 by means of a tube 2 and on the pressure side connected to the tube coil 4 of the drier, while the fan 6 is arranged between the tube coil 4 and the first double conical tube section 7. The last fan 13, is connected on the suction side to the cyclone 10 by means of a tube 12, and the cyclone in its turn is connected to the last double conical tube section 8 of the drier by means of a tube 9. The medium separated from the material in the cyclone 10 is blown out by the fan 13 through the duct 14 into the open. The fans are driven by electrical motors 15, 16, and 17 and one or more of the fans is according to the invention made with speed control so that zero pressure can be maintained at the feeding point 5 of the material as well as at its discharge point in the outlet 11 of the separation cyclone 10. In the illustrated embodiment the fan 6 works at a constant speed so adjusted that the total pressure of the fan equals estimated normal resistance in the transport system from the feeding point 5 of the material to the cyclone 10. The fans 3 and 13, which are to overcome the resistance in the remaining parts of the transport system, are made with speed control means as indicated at 18 and 19. To the extent that the resistance in the transport system between the inlet 5 and outlet 11 during the run diverge from estimated normal value—leading to that air is sucked in or blown out at one or both of these points—the pressure delivered by the fans 3 and 13 respectively, is increased or reduced respectively by means of an increase or a reduction of the speed of the fans until the normal atmospheric pressure is restored at the mentioned points 5 and 11. The adjustment can be made either manually by the personnel when observations made at the points 5 and 11 so indicate—or automatically in response to impulses from pressure-responsive instruments 20 and 21 placed at said points.

The application of the invention is naturally not restricted to the use shown in the drawing but can be applied in all pneumatic transport apparatus where the character of the material precludes the use of special feeding and discharge devices.

What I claim is:

In pneumatic transporting apparatus having a pneumatic conveying tube, a feeding chute at a feeding point in said tube to introduce material into said tube, a cyclone connected to said tube to separate said material from the pneumatic conveying medium and having an open outlet for the discharge of the separated material, three fans for the pneumatic conveying medium, one of said fans having its exhaust side connected to said tube upstream of the feeding point, the second of said fans having its suction side connected downstream of said cyclone, and the third of said fans being connected between said feeding point and discharge outlet for the material, and speed control means for at least one of said fans operable to maintain zero pressure at the feeding point of the material as well as at the discharge outlet of the cyclone.

References Cited in the file of this patent

UNITED STATES PATENTS

| 2,539,109 | Webb | Jan. 23, 1951 |
| 2,810,609 | Temple | Oct. 22, 1957 |

FOREIGN PATENTS

| 23,594 | Great Britain | Oct. 23, 1896 |